United States Patent Office 3,538,791
Patented Nov. 10, 1970

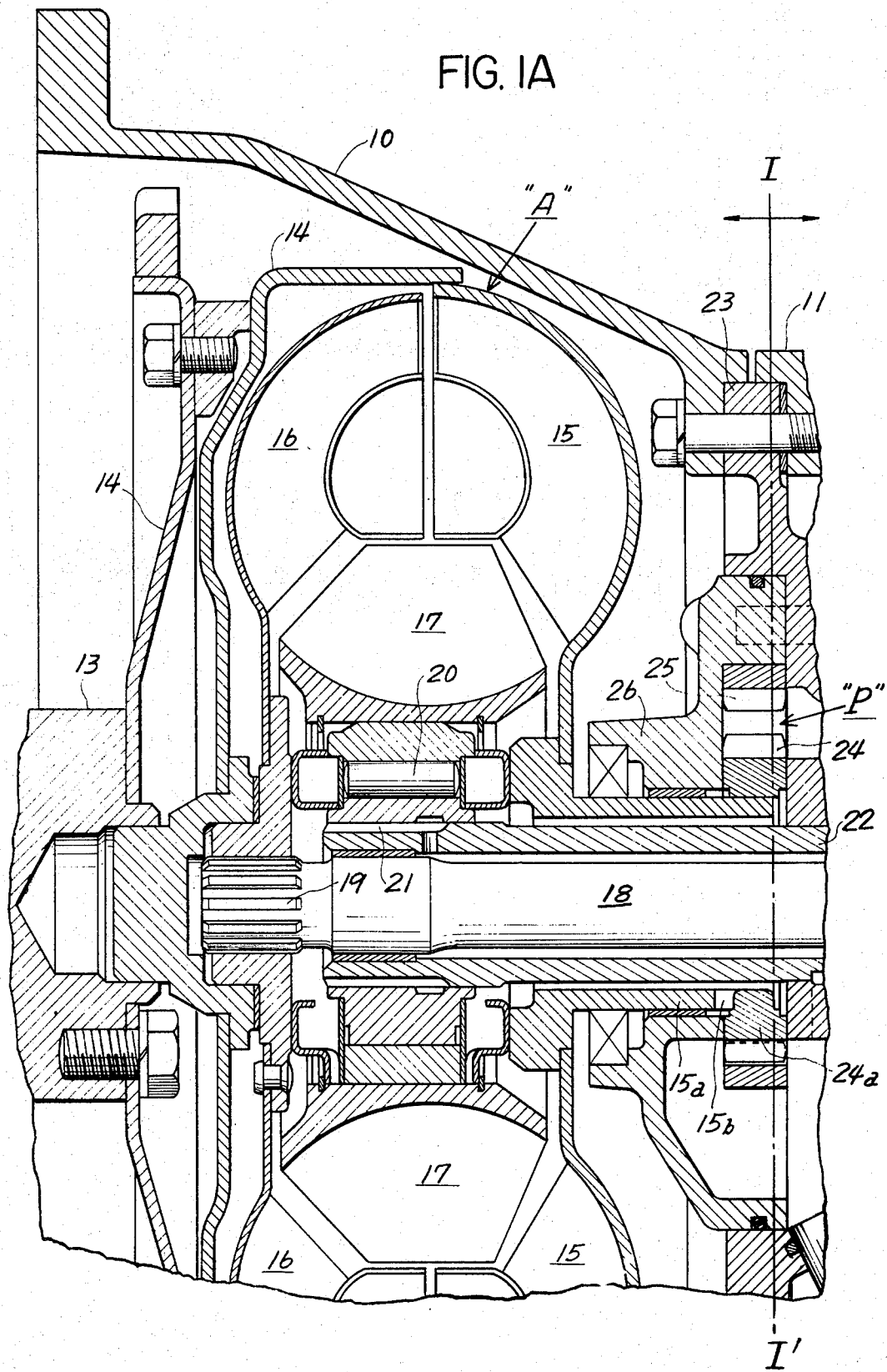

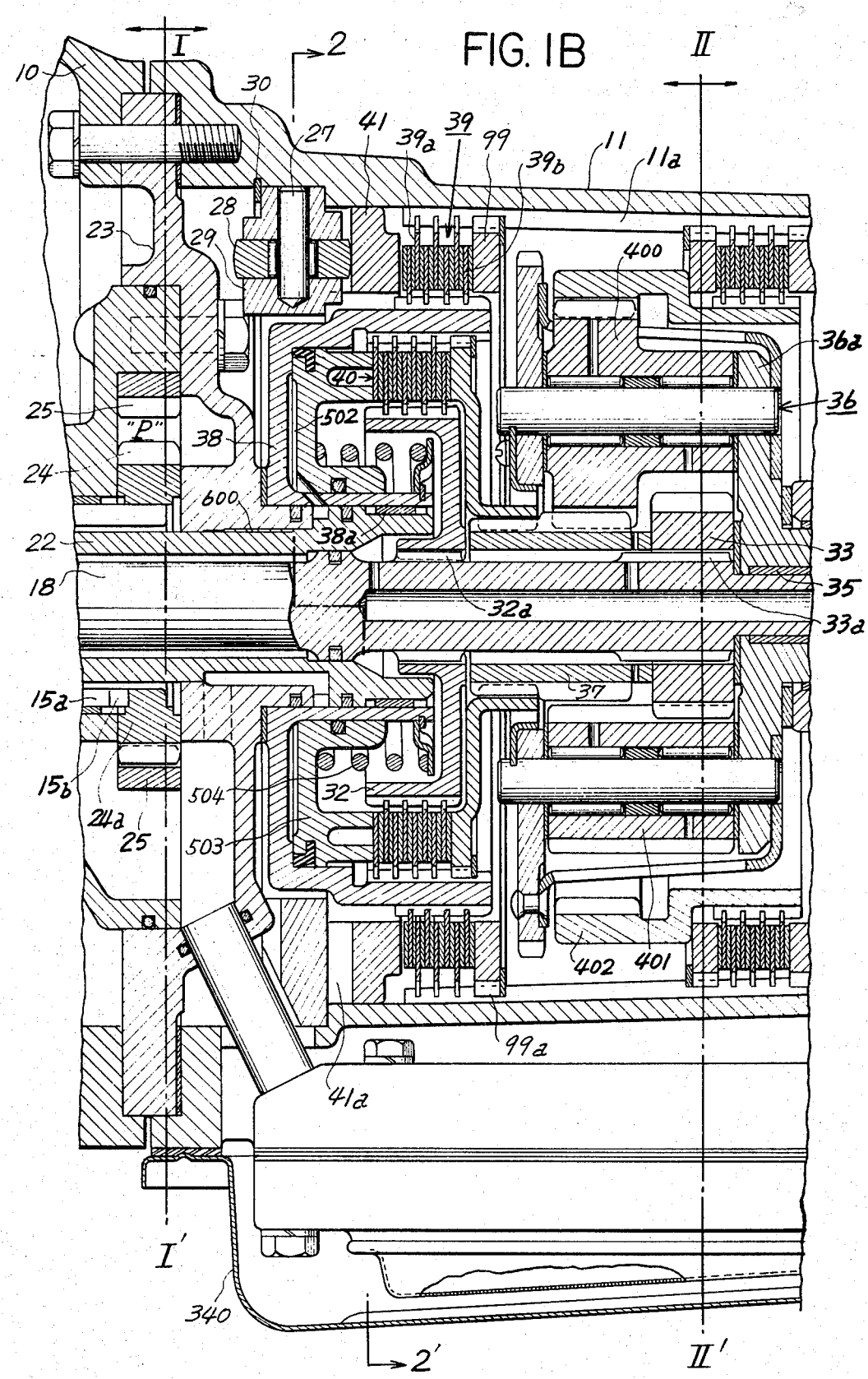

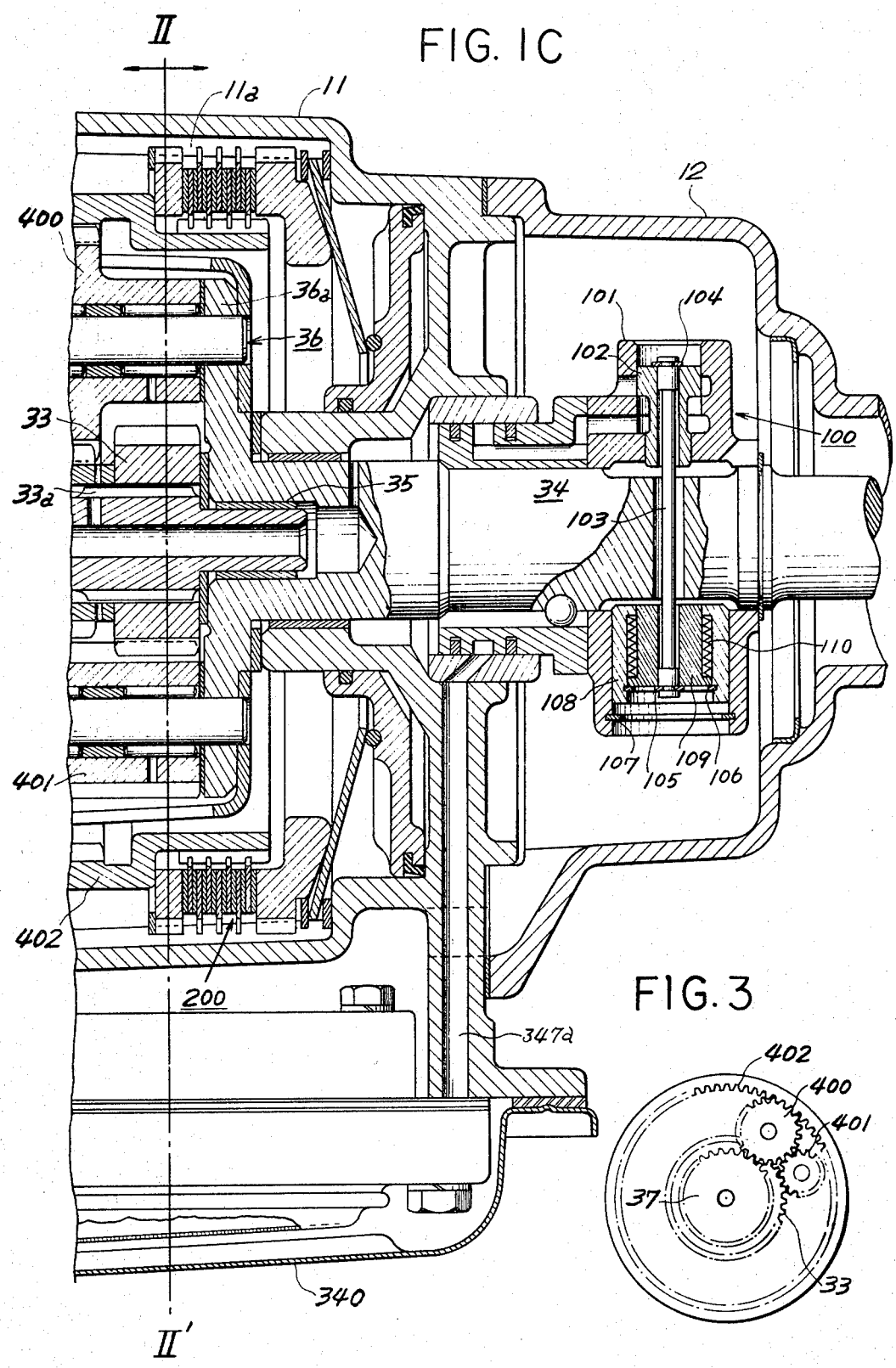

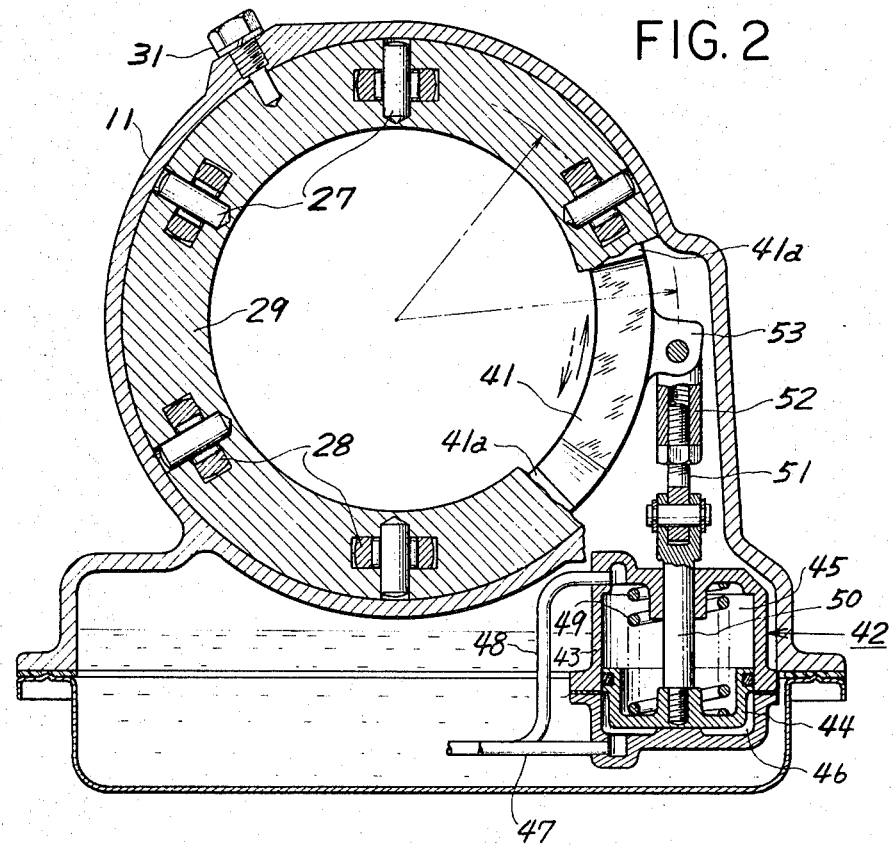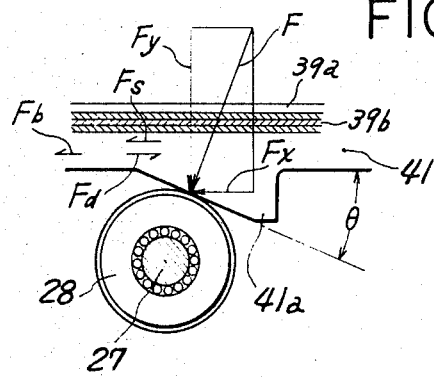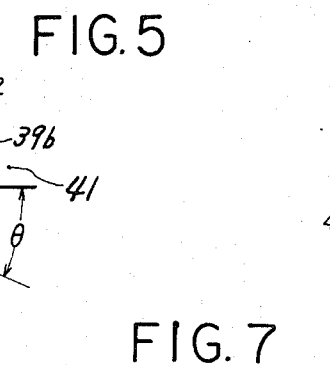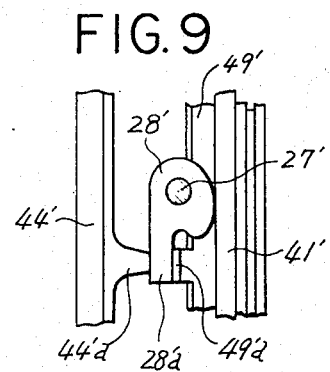

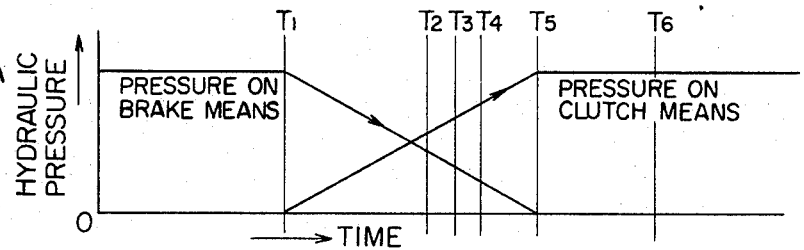
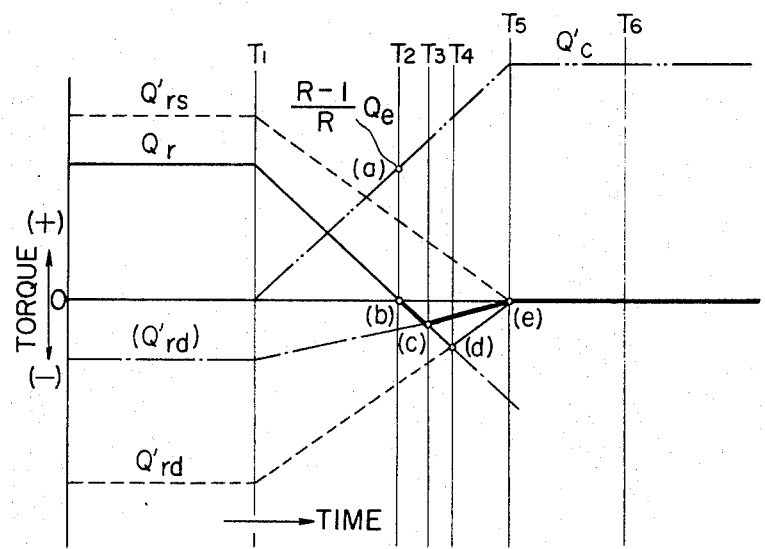
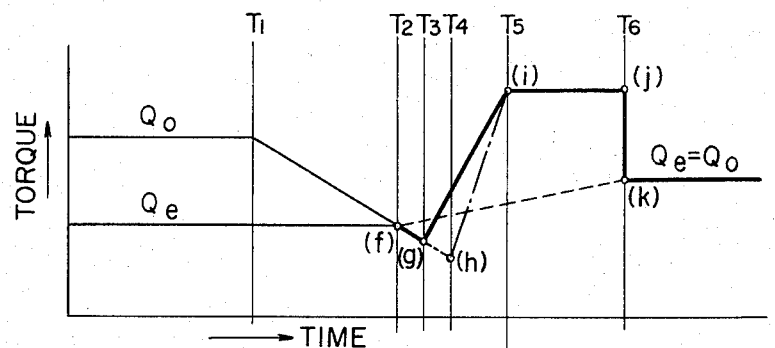
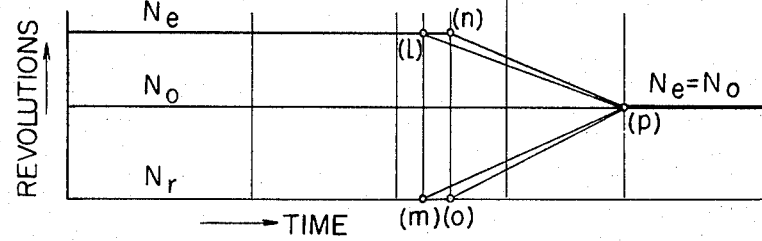

3,538,791
AUTOMOTIVE AUTOMATIC SPEED CHANGE UNIT
Tadao Asano, Hiroji Yamaguchi, Shigetoshi Kurahashi, and Koichiro Hirozawa, Kariya-shi, Japan, assignors to Aisin Seiki Company Limited, Kariya-shi, Aichiken, Japan, a corporation of Japan
Filed Sept. 16, 1968, Ser. No. 759,929
Claims priority, application Japan, Sept. 16, 1967, 42/79,359
Int. Cl. F16h 57/10; B60k 19/14
U.S. Cl. 74—781                                   6 Claims

ABSTRACT OF THE DISCLOSURE

In an automatic automotive transmission having two or three speed change stages, a brake means of the multiple friction disc type is provided which means is attached in turn with an inclined cam surface intended for actuating said brake means, thereby establishing an optimum ratio between the self-energizing brake torque and the de-energizing torque appearing in the brake means in the course of each speed change operation.

---

This invention relates to improvements in and relating to automotive automatic speed change mechanism.

Although hithertofore considerable progress has been made in the field of automotive automatic speed change mechanism incorporated with hydraulic coupling or hydraulic torque converters, it is a still grave problem to suppress appreciable stocks which appear at the moment of speed change operations.

It is therefore one of the main objects of the present invention to provide an automotive automatic speed change mechanism of the above kind which is capable of performing speed change operations without appreciable operation shocks.

It is a further object of the invention to provide an improved speed change mechanism of the above kind which is provided with brake means adapted for receiving a proper ratio between the related self-energy torque and de-energy torque for performing a smooth operation for speed change.

These and further objects, features and advantages of the present invention will become more clear as the description proceeds by reference to the accompanying drawings which illustrate several preferred embodiments of the invention given exclusively for illustrative purpose and thus in no limiting sense of the present invention.

In the drawings:

FIG. 1A, 1B and 1C constitute in combination a single longitudinal sectional view of a preferred embodiment of the automotive automatic speed change mechanism embodying the novel teaching of the invention.

FIG. 2 is a partial cross-sectional view taken substantially along the sectional line 2–2′ shown in FIG. 1B, wherein however several working parts have been omitted for simplicity.

FIG. 3 is a schematic cross-sectional view of the planetary gearing employed in the foregoing mechanism wherein however two pairs of short and long pinions have been omitted for clarity.

FIG. 5 is a schematic explanatory representation of a main working part and several related parts employed in said embodiment, illustrative of several working forces acting among said parts.

FIGS. 6A, 6B, 6C and 6D are illustrative of several operation diagrams which show specific working modes of the speed change mechanism embodying the new teachings proposed by the invention, when a low speed drive ratio is transferred to a high speed drive ratio.

FIG. 7 is a schematic explanatory view showing the power train in the arrangements shown in FIGS. 1 and 8.

FIG. 9 is an enlarged detail view of a cam employed in the modification shown in FIG. 8, together with several related parts thereof.

Figure 4:
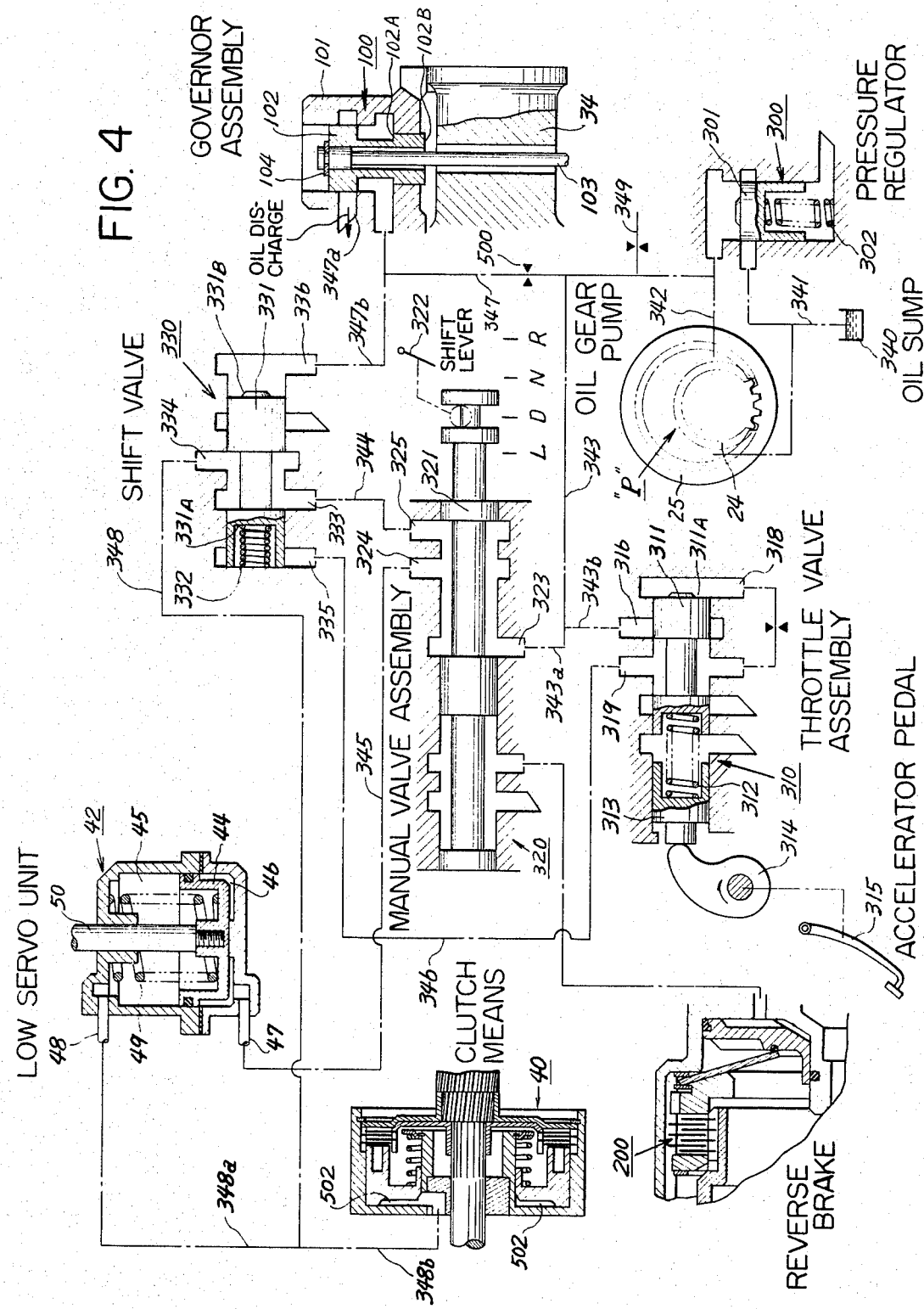
FIG. 4 is a schematic and explanatory representation of the hydraulic circuit employed.

Referring now to the accompanying drawings, especially FIG. 1 thereof, numerals 10, 11 and 12 illustrate three successive housing parts bolted one after another, although the bolted connection between the last two housing parts 11 and 12 has been omitted from the drawing for simplicity.

Numeral 13 denotes the output end of the crankshaft of an automotive internal combustion engine, not shown, said shaft end being rigidly connected with a turning disc assembly 14 which is in turn connected drivingly with a pump wheel 15 of a fluid torque converter, generally shown at A in FIG. 1A. This converter includes further, yet as conventionally, a turbine wheel 16 and a stator wheel 17. Although not shown, the working fluid of the torque converter circulates through the wheels 15, 16 and 17 in the order as specified, when the converter operates in its normal working mode.

Numeral 18 illustrates an input shaft which is splined at 19 with the turbine wheel 16 at the left-hand extremity of the shaft 18 when seen in FIG. 1A.

The stator wheel 17 is operatively connected through one way clutch 20 and spline connection 21 with a hollow stator shaft 22 which is mounted rotatably and in parallel to the input shaft 18 along a considerable length thereof.

Substantially in registration with the bolted connection between the first and second housing parts 10 and 11, there is provided a gear pump assembly, generally shown at P in FIGS. 1 and 4, which comprises pump cover 23, inner gear 24, outer gear 25 meshing therewith and pump body 26, said cover being bolted between said first and second housing parts in a sandwiched manner as shown.

A plurality of, herein six, radial pins 27 mount rotatably each a roller 28 and are kept in position in a retaining ring 29 which is prevented from axial movement as well as radial movement at 30 and 31, respectively, as shown in FIGS. 1–2.

Clutch hub 32 and input sun gear 33 are splined at 32a and 33a, respectively, to said input shaft 18 which is telescopically connected at its right-hand end with an output shaft 34 at its lefthand end when seen in FIG. 1. These shafts 18 and 34 are arranged along a common axis as shown, bushings 35 being provided between the cooperating shaft ends for allowing relative rotation of the both shafts. The output shaft is connected drivingly to a propeller shaft, not shown, which is conventionally arranged to drive vehicle rear wheels, equally not shown. The shaft 34 is formed integral at its extremity with the carrier at 36a of a planetary gearing, generally shown at 36, the low sun gear 37 of which is fixedly connected with a clutch drum 38, said gearing comprising: three long pinions 401 rotatably mounted on said carrier 36a; three short pinions 400 rotatably mounted again on said carrier; said input sun gear 33 meshing with said long pinions; said short pinions meshing with respective long pinions; said low sun gear 37 which meshes with said short pinions; and a ring gear 402 which meshes with said short pinions (see especially FIG. 3). Said clutch drum 38 is fitted with brake means 39 and clutch means 40. Brake means 39 is formed into a multiple disc type having non-rotatable disc members 39a and rotatable disc members 39b relative to stationary housing member 11. Said clutch means 40 is provided with said clutch hub 32. Said clutch drum 38 is splined at 38a to the hollow stator shaft 22, as shown.

With clutch means 40 being brought into its actuated position, as will be described more fully hereinafter, said input shaft 18 and clutch drum 38 are rotated in unison with each other, so far as the input shaft is rotated by the engine crankshaft 13. Said disc members 39b are mounted slidably on the outer peripheral surface of said clutch drum 38, yet being rotatable in unison with the latter, while said disc members 39a are mounted slidably relative to a number of parallel ribs 11a formed on the inside wall surface of housing member 11, yet being non-rotatable relative with the latter.

Pressure plate 41 formed into an axially slidable ring is formed with a plurality of actuating projections or cams 41a only one of which is shown representatively in FIGS. 2 and 5. As will be well supposed from the foregoing, each of these cams 41a is tapered of course in the peripheral direction of the pressure ring plate 41.

When this plate 41 is rotated so as to bring any one of said cam surfaces 41a into pressure engagement with the rollers 28, thrust is generated to move the pressure plate 41 in the right-hand axial direction in FIG. 1 and thus both series of friction discs 39a and 39b are brought into engagement with each other, the thus engaged brake disc assembly being further forced to move against a back-up ring plate 99 which is positively prevented at 99a from its axial and rotational movements. With the brake means 39 thus engaged, rotation of the clutch drum 38 is brought into stop.

In order to actuate said brake means 39 in the above-mentioned way, there is provided a hydraulic actuator unit, generally shown at 42 in FIG. 2 and comprising a stationary hydraulic cylinder 43 and a movable piston 44 slidably housed therein, thereby the interior space of the cylinder being divided into two separated chambers 45 and 46. There is provided a return spring 49 in the upper cylinder chamber 45 urging the piston towards its lowermost or resting position shown in FIG. 2. For actuation of said brake means 39 by partial turning of the pressure plate 41, pressure fluid is fed from inlet piping 47 to the lower cylinder chamber 46 so as to elevate the piston 44 in its position from its normal one shown in FIG. 2, against the urging force provided by return spring 49. Motion is transmitted from the piston through piston rod 50, connecting rod 51 hinged thereto, adjusting sleeve 52 threadedly receiving the threaded end of said rod 51, eye piece 53 hinged to said sleeve and made intergral with rotatable pressure plate 41, finally to the latter.

For releasing said brake means 39 by partial turning of said pressure plate in its returning direction, pressure fluid is supplied from piping 48 to the upper cylinder chamber 45 while excess fluid is discharged from the lower cylinder chamber 46 to the attached piping 47, so as to lower the piston 44 from its elevated position to its normal position shown in FIG. 2, thereby the return spring 49 participating this return action in the assisting sense. By this lowering operation of said hydraulic piston 44, the pressure plate 41 is rotated in clockwise direction in FIG. 2, as shown by a dotted arrow, so as to release the brake means 39.

The embodiment so far shown and described, as well as a modification therefrom shown in FIG. 8 and to be described hereinafter, is arranged to have two forward speed change stages, or more specifically forward low speed and high speed stages, in addition to a reverse speed change stage, the forward speed change operations from "high speed" to "low speed" and vice versa being carried into effect in "automatic" manner as so-called. There are provided four speed ranges: "Low range," "Drive range," "Neutral range" and "Reverse range" which can be manually set, as is conventional with this kind of automatic transmission, by controlling a shift lever 322, FIG. 4, in which said four control positions of the lever are shown at L, D, N and R, respectively. The drive range D has said two stages of "low" and "high" which are automatically selected depending upon the engine load, on the one hand, and the vehicle speed, on the other hand.

The hydraulic circuit shown in FIG. 4 corresponds to the operating condition for the drive range D.

As was referred to hereinbefore, the oil pump P is arranged to be driven from the engine crankshaft 13 through pump wheel boss 15a having recesses at 15b, only one of the latter being illustrated in the lower half of FIG. 1, said recesses being kept in driving engagement with corresponding motion receiving claws 24a formed on said inner gear 24.

Gear pump P sucks oil from reservoir 340 through suction pipe 341 and delivers it to pressure regulator valve assembly 300 through feed pipe 342. The thus pressure regulated oil is delivered to inlet port 323 of manual spool valve 321 through ducts 343 and 343a. The oil is then delivered from outlet ports 325 and 324 when the system is in its drive range D to inlet port 333 of shift valve 330 and inlet 47 to "low servo" or hydraulic actuator unit 42, through pipings 325 and 344 on the one hand, and through pipings 324 and 345, on the other hand. As seen, the valve 321 is controlled by means of shift lever 322. Shift valve 330 is adapted to automatically change off the high speed stage to the low speed stage and vice versa, so far as the hydraulic system is set to the drive range D, as shown. Low servo 42 serves for changing off between drive range D and low range L through the cooperation with said clutch means 40.

The aforementioned pressure regulated oil is delivered also to inlet 316 of throttle valve assembly 310 which is controlled by throttle lever 314 arranged to cooperate with accelerator pedal 315, thence through valve chamber 317 formed in the valve assembly, to another valve chamber 318 where the oil pressure will act upon one end 311A of valve 311, the latter being thereby moved in the left-hand direction in FIG. 4. In opposition thereto, motion is transmitted depending upon the occasional depression of pedal 315 to lever 314 which is pivotably mounted and kept in pressure engagement with down shift plug 313 which is thus shifted in the right-hand direction, thereby a compression spring 312 inserted between throttle valve 311 and the plug 313 being further compressed. The thus pressure regulated oil is then delivered from outlet 319 through piping 346 to inlet 335 of shift valve 330, and at a certain, yet variable pressure level $P_{th}$.

On the other hand, the aforementioned pressure-regulated oil is conveyed through orifice 500 to inlet 501 to governor body 101 of governor assembly 100 fixedly mounted on output shaft 34 (also, see FIG. 1C), said inlet 501 serving as outlet when occasion desires. By the rotational movement of said governor assembly 100 comprising, in addition to said body 101, valve piston 102; piston rod 103 passing traversely through output shaft 34; snap ring 104 serving to fixedly attach said valve piston of differential type to said piston rod, snap ring 105 serving to fixedly attach inner governor weight 109 to said piston rod; snap ring 106 attached to outer governor weight 108 for limiting the slidably movable range thereof relative to said inner weight; further snap ring 107 attached to said body 101 for limiting outwardly sliding movement of said outer weight; and compression spring 110 inserted between said both weights 108 and 109, centrifugal forces are induced in these weights, thereby valve piston 102 being urged to move downwards in FIGS. 1 and 4. Since the governor valve has been constructed as a conventional pressure regulator as in the case of that shown at 300, the differential oil pressure between those acting upon ring surfaces 102A and 102B of governor piston 102 will urge the latter to move upwards in the drawing. This hydraulic pressure, however, is balanced out by the aforementioned centrifugal forces.

The hydraulic pressure thus balanced and established is conveyed from the governor valve assembly through conduits 347a and 347b to inlet 336 of said shift valve assembly 330.

Valve member 331 of the shift valve assembly 330 is controlled in its position by the combined action of spring 332, hydraulic throttle pressure $P_{th}$ acting on end at 331A of valve member 331, hydraulic governor pressure $P_g$ acting on the opposite end 331B of the same valve member, thereby conducting or shutting off the preparatorily controlled hydraulic line pressure $P_l$ through the outlet at 334 of the shift valve assembly 330.

When the above-mentioned cut-off operation is brought about, pressure oil kept in communication with said outlet 334 within the assembly 330 will be discharged from a discharge outlet 335 which leads to said oil reservoir 340, although the return conduit serving for this purpose has been omitted for simplicity.

On the contrary, when the above-mentioned conducting operation is brought about, the controlled line pressure $P_l$ is conveyed on the one hand from said outlet 334 through conduits 348 and 348a to inlet 48 of low servo assembly 42, thence further to cylinder chamber 45, as was already referred to by reference to FIG. 2.

On the other hand, same line pressure $P_l$ is conveyed from conduit 348b to clutch chamber 502 of clutch means 40, thereby piston 503 being moved hydraulically in the right-hand direction in FIG. 1 and thus the clutch being brought into engagement against the action of spring 504 contained therein. Thus, the high speed stage of the transmission is established, as was briefly referred to hereinbefore.

Since, until this moment, same line pressure $P_l$ has been applied to another cylinder chamber 46 of low servo unit 42, said line pressure now prevailing within the upper cylinder chamber 45 is substantitally balanced out, so that the spring force 49 will become predominant, thereby servo piston 44 being kept in the high speed range or bottom position shown in FIG. 4. In this connection, reference may better be had to FIG. 2 and its related disclosure. It will be thus understood that the conditions of the hydraulic circuit shown in FIG. 4 corresponds to the high speed stage of the drive range D.

When throttle pressure $P_{th}$ acting upon one end 331A of shift valve 331 is higher than governor pressure $P_g$ acting upon the opposite end 331B of the valve 331, the line pressure conveyed from the manual valve is cut off, end shift valve 331 is moved from the position shown to the right-hand side. Thus, hydraulic pressure prevailing in chamber 45 of low servo unit 42 is discharged therefrom through the port 48, and simultaneously therewith, hydraulic pressure is released from oil chamber 502 of clutch means 40 through ports 334 and 335 of shift valve assembly 330, to said oil reservoir 340.

On the other hand, line pressure $P_l$ is conveyed through port 47 of low servo unit 42 to apply side or lower cylinder chamber 46 thereof, thus acting upon the low servo piston 44 which is thereby elevated in its position against spring action at 49, as was referred to hereinbefore with reference to FIG. 2. By this operation, the low brake means 39 is brought into operation, as was already described. In this way, an automatic speed change operation from the high speed stage to the lower speed one in the drive range D is brought about.

Various other speed change operations can be well imagined from the foregoing detailed description which has been made so far, substantially by reference to FIG. 4, because substantial part of the hydraulic circuit shown therein is conventional and thus does not constitute the invention.

Next, referring to FIG. 5, how to optimumly decide the inclination angle $\theta$ of each of said actuating projections 41a having a common wedge configuration.

Now assuming the engine torque as measured at the crankshaft 13 being $T_e$, the torque ratio of the fluid torque converter A being $t$ and the speed reduction ratio or the ratio of the r.p.m. of input shaft 18 to that of output shaft 34 being $1/R$, the torque $Q_r$ applied to clutch drum 38 will be:

$$Q_r = (R-1) \cdot T_e \cdot t$$

When further assumed that the total number of friction discs 39a and 39b comprised in brake means 39 be $n$, the number N of frictional engaging surfaces will be:

$$N = 2n$$

Therefore, the torque $T_p$ applied to pressure plate 41 will be:

$$T_p = Q_r / 2n$$

Still further assuming that the urging force applied to the pressure plate 41 necessary for bringing the brake means 39 into its engaging position be $F_y$, the effective radius of each of said friction discs 39a or 39b being $R_m$, and the friction coefficient being $\mu$, then we obtain:

$$F_y = Q_r / (\mu \cdot 2n \cdot R_m)$$

On the other hand, it will be understood that a certain turning effort or force, which may be expressed by $F_b$ as shown, acts at a circle connecting several engaging points between pressure plate 41 and back-up rollers 28, the radius of such circle being shown at $R_b$ in FIG. 3, under the influence of the actuating force, which may be denoted $F_B$, exerted by the servo piston 44 when the latter is actuated hydraulically to elevate its position, as was referred to hereinbefore by reference to FIG. 2.

The effects of provision of actuating projections or cams 41a will be understood from the following description.

Under engine drive conditions, when torque $Q_r$ acts upon the clutch drum 38 in left-hand direction in FIG. 2, a certain force, which may be denoted $F_s$ as shown in FIG. 3, will be induced upon the said circle having a radius $R_b$ by virtue of the frictional engagement of pressure plate 41 and friction disc assembly 39a–39b. As seen, the acting direction of this force $F_s$ corresponds to that of the aforementioned force $F_b$ caused by the actuation of servo piston 44 and thus acts as self-energizing force.

On the contrary, when a certain torque such as $Q_r$ acts in the right-hand direction under engine braking conditions, certain force which may be denoted $F_d$ as shown, directing in the opposite sense to $F_s$ will act on the circuit of the radius $R_b$ by virtue of the frictional engagement of stationary and rotatable discs 39a and 39b. This force $F_d$ is of the de-energizing nature.

The braking force $F_y$ under engine drive conditions will be:

$$F_s = \mu \cdot F_y$$

Since $$F_x = F_s + F_b$$

$$F_y = \frac{F_b + F_s}{\tan \theta}$$

thus, $$F_y = \frac{F_b}{\tan \theta - \mu}$$

In the similar way, $$F_d = \mu \cdot F_y$$

$$F'_y = \frac{F_b - F_d}{\tan \theta}$$

thus, $$\theta = \tan^{-1} \frac{\mu(F_y - F'_y)}{F_y - F'_y}$$

Since, the maximum torque ratio of the torque converter used for passenger vehicles is generally set to:

$$t_{max} = 2.5$$

It can be estimated with safety that the engine torque under engine braking conditions is 30% or less than the regular engine drive conditions.

Thus, $$\theta = \tan^{-1}\mu \frac{2.5(R-1)T_e + 0.3T_e(R-1)}{2.5(R-1)T_e - 0.3T_e(R-1)}$$

$$= \tan^{-1}\mu \frac{2.5 + 0.3}{2.5 - 0.3}$$

$$\approx \tan^{-1} 1.273$$

when assuming $$\mu = 0.1, \text{ then}$$
$$= 7° - 15'$$

With reasonable allowances, the value $\theta$ may be set to 5°–10°.

It will be understood from the foregoing that the value $\theta$ is independent of the engine torque $T_e$. Thus, with different engine performance occasionally employed, the braking capacity of brake means 39 may be modified by altering the number of brake discs 39a and 39b, while all other brake elements at 39 may be reserved as originally employed.

It will be further clear that by altering in the design stage the inclination angle $\theta$ of each of the actuating projections 41a, the relative ratio between said self-energizing torque and de-energizing torque in the above sense can be modified as desired so as to minimize otherwise appreciable shocks encountered at the speed change operation for the automotive vehicle.

In the following, the effects attainable with provision of said cams 41 will be described in the case of shift-up operation for changing the low speed stage to the high speed stage. For this purpose, brake means 39 is released while clutch means 40 is brought into engagement. On the other hand, when it is desired to perform a shift-down operation from the high speed stage to the low speed stage, brake means 39 is engaged while clutch means 40 is released.

Nomenclatures are:

$Q_e$, $Q_o$ and $Q_r$—torques applied to input shaft, output shaft and reaction member, respectively;
$Q'$—capacity of clutch means or brake means;
$N_e$, $N_o$ and $N_r$—revolutions per minutes of input shaft and reaction member, respectively;
$R_1$—low gear ratio.

The suffix $c$ concerns with said clutch means. As for the sign of Q or N, the positive one concerns with the rotational direction shown by full line arrows in FIG. 7.

In case where the reaction member or clutch drum 38 is locked and the clutch means 40 is kept in released condition, then $$N_r = 0$$
$$Q_r = (R-1)Q_e$$
$$N_e = R \cdot N_o$$
$$Q_e = Q_o/R$$

In this case, when the clutch means is in its slipping condition and the reaction means is kept as before in its locked condition, then $$N_r = 0$$
$$Q_r = (R-1)Q_e - R \cdot Q'_c$$
$$N_e = R \cdot N_o$$
$$Q_o = Q_e + Q_r$$
$$Q_o = R(Q_e - Q'_c)$$

In case where both the reaction member and the clutch means slip, then $$N_r \neq 0$$
$$N_e + (R-1)N_r = R \cdot N_o$$
$$Q_o = Q_e + Q'_r$$
$$Q_o = \frac{R}{R-1}(Q'_r + Q'_c)$$
$$Q_e = \frac{1}{R-1}(Q'_r + R \cdot Q'_c)$$

When the reaction member is in its slipping condition, while the clutch means is locked, then $$N_e = N_r = 0 \neq 0$$
$$Q_o = Q_e - Q'_r$$
$$Q_o = Q_e - \frac{1}{R} \cdot Q_o$$
$$Q_c = \frac{R-1}{R} \cdot Q_e - \frac{1}{R} \cdot Q'_r$$

When the reaction member is in its free condition and the clutch means is in its slipping condition, then $$N_e \neq N_o$$
$$Q_a \neq Q_o$$

When the reaction member is again in its free condition, while the clutch means is in its locked condition, then $$N_e = N_o$$
$$Q_e = Q_o$$

In FIG. 6A, hydraulic pressures acting upon said brake means and said clutch means are illustrated in function of time and in the case of up-shift operation. When the hydraulic pressure acting on clutch means 40 begins to increase at T1, the hydraulic pressure acting upon brake means 39 starts to decrease as shown.

Corresponding various torque curves are shown in FIG. 6B.

In the figure, the definition of $Q'_c$ is same as before. The definition of $Q'_r$ is somewhat complicated when considering the rotational direction of clutch drum 38 which has a tendency to rotate in the opposite direction to the revolution of input shaft 18 in the low speed stage when the latter has been set, although in this case the drum is kept forcibly in its stationary position. In fact, the aforementioned value $Q'_r$ corresponds to the braking effort applied to the clutch drum for bringing it into dead stop. $Q'_{rs}$ shown in FIG. 6B is defined by the self-energizing brake torque which acts for stopping the counter clockwise rotation of the clutch drum when seen from left-hand side of FIG. 1 towards right-hand side thereof. On the other hand, $Q'_{rd}$ is defined by the de-energizing brake torque which acts for stopping the reversed or clockwise rotation of the clutch drum when seen in the same direction as above mentioned. $Q_r$ is same as was defined hereinbefore. $(Q'_{rd})$ corresponds in its nature to that defined by $Q'_{rd}$, the former being however of a considerably reduced value from the latter by adopting the new teaching proposed by the present invention.

When $Q_r = 0$ in the foregoing Formula 1, then $$Q'_c = \frac{R-1}{R} Q_e$$

this specific value of clutch capacity will appear at the point (a) in FIG. 6B, corresponding to the time point T2 shown therein. With further increase of $Q'_c$, the value $Q_r$ which is a kind of opposing effort to the desired up-shift operation will shift from (b) towards (d), thus increasing its absolute value, yet in the negative torque range. At the point (d) at time point T4, the torque $Q'_{rd}$ appearing at the brake means 39 will become smaller than the value $Q_r$, thus the brake means initiating a slipping operation. With decrease of absolute value of $Q'_{rd}$ from point (d)

to (e) at time point T5, where the value of $Q'_{rd}$ becomes nil, thus said brake means being released.

Next, referring to FIG. 6C which illustrates the time variation of output shaft torque $Q_o$. This output $Q_o$ can be expressed by the foregoing Formulae 2 and 3. With increase of the hydraulic pressure acting upon the clutch means, clutch torque increases correspondingly, as was illustrated in foregoing FIG. 6B, thereby the reaction torque $Q_r$ being reduced. Thus, the output torque $Q_o$ will begin to decrease at time point T1, while at the point (h) corresponding time point T4 it begins to increase by virtue of reduction in the torque $Q'_{rd}$ of brake means 39. With further increase of clutch torque $Q'_c$, where the operation is in a transient step from the low speed stage to the high speed one, related input side members of transmission are reduced in respective operational speeds, resulting in the addition of moments of inertia of these input members to the driving effort by the engine. In practice, however, the capacity $Q'_c$ of said clutch means has an ample value for absorbing substantial part of such moments of inertia, the output torque curve $Q_o$ will travel from the point (h) through points (i) and (j) to the point (k) where $N_e = N_o$. At this moment, the desired speed change operation for shifting from "low" to "high" has been completed.

In FIG. 6D, revolutional characteristics: $N_e$, $N_o$ and $N_r$ are illustrated at several time points T1-T6 which have also been shown in the foregoing several figures.

By the provision of specific brake means such as at 39 in the transmission system according to this invention, an optimum design ratio of $Q'_{rs}$ to $Q'_{rd}$ can be determined and adopted as guided by the novel teaching so far described in the present specification. Thus, a reduction of $Q'_{rd}$ to $(Q'_{rd})$ will bring the curve $Q_r$ to pass through more favorable points (b), (c) and (e). In the similar way, the output torque curve $Q_o$ will pass through more advantageous points (f), (g), (i), (j) and (k). As observed from the improved output torque curve $Q_o$, variation in the output torque during the transient period such as from T2 to T6 may be reduced considerably from those which are frequently encountered in the known comparative technique. Thus, highly advantageous avoiding of otherwise encountered severe shocks in the course of speed change operations.

Although a shift-up operation has been illustrated in the foregoing as a representative operation, similar advantages can be attained in the course of the shift-down operation.

Figure 8:
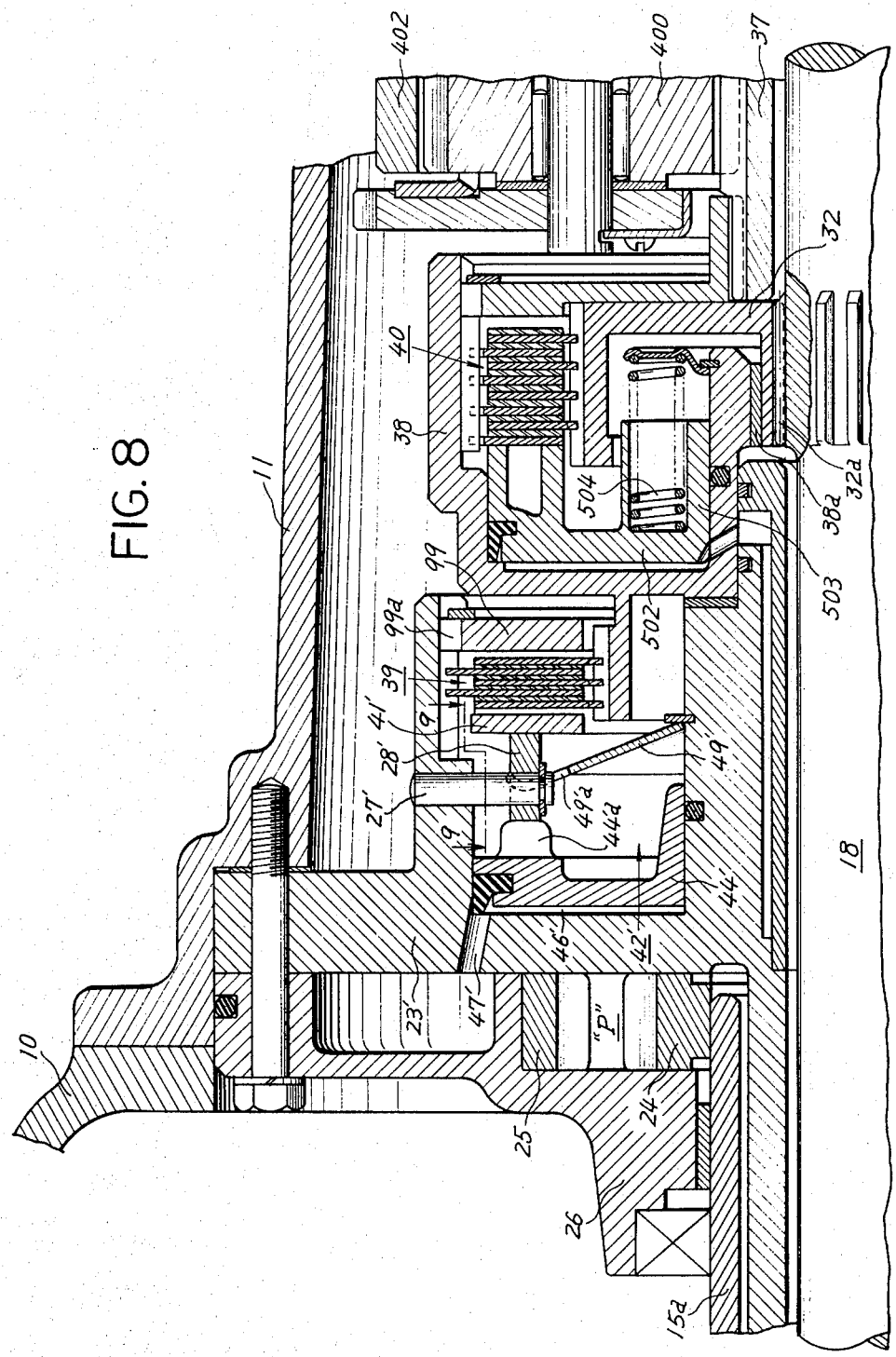
FIG. 8 is a simplified and only partially illustrated longitudinal sectional view of a modified arrangement of the speed change mechanism.

In FIGS. 7-9, a modified embodiment of the invention is shown. As seen, substantial constituents of the transmission are similar in their design and function to those which have been employed in the foregoing embodiment. Therefore, similar parts to those which have been used in the said embodiment are attached with same reference numerals as in the foregoing embodiment, yet being affixed each with a prime. The main difference from the foregoing resides in the design and function of the low servo unit. In the present case, hydraulic piston 44' is formed with a projection 44'a which is adapted for cooperation with a pivotable actuator cam 28'a pivotably mounted by a stationary pin or pivot 27' on pump cover 23' and fitted with a return spring 49 having a portion 49a which is attached to said cam.

When hydraulic pressure is applied on the piston 44' from left to right in FIG. 8, the projection 44'a will act at 28'a upon the cam 28' for turning it in counter clockwise direction in FIG. 9 about the pivot 27', so that a positive urging pressure is applied in the right-hand ward axial direction on to pressure plate 41', by which the non-rotational friction discs 39'a and 39'b are brought into pressure engagement one after another, thereby this brake means 39 being actuated. Similar improvements are attained by modifying the cam configuration of said member 28' in this case, in place of proper selection of said inclination angle in the foregoing.

In FIG. 7, a simplified and explanatory arrangement of the planetary gearing, together with said clutch means and brake means, is shown which is applicable to the said both embodiments of the present invention. From this figure and the foregoing description, the main working modes of the gearing can easily be thought out by those skilled in the art, without further detailed analysis of this illustrated arrangement.

It should be noted that the low servo unit 42 can be replaced by a correspondingly operating electric mechanism such as comprising electromagnetic means.

In a still further modified form, the number of speed change stages can be increased from two to three without difficulty. For this purpose, a clutch is provided between the input shaft 18 and the clutch hub 32, the clutch hub of the newly provided clutch being operatedly connected with said input sun gear 33.

Although substantially two exemplary embodiments of the invention have been disclosed herein for purposes of illustration, it will be understood that various changes, modifications and substitutions may be incorporated in such embodiments without departing from the spirit of the invention as defined by the claims which follow.

What we claim is:

1. An automotive automatic transmission comprising in combination and input shaft, an output shaft, a stationary housing member for housing said input shaft and said output shaft therein, a planetary gear assembly comprising a first drive element operatively connected with said input shaft, a second drive element operatively connected with said output shaft, and a third driven element, said planetary gear assembly being adapted for establishing any selected one of a plurality of speed ratios between said input shaft and said output shaft, clutch means comprising a clutch drum fixedly connected with said third driven element, said clutch means adapted for engaging and disengaging said third driven element with said input shaft, brake means fixedly attached to said stationary housing member, said brake means adapted for engaging and disengaging said third driven element with and from said stationary housing member, cam means provided between said third driven element and said stationary member, said cam means adapted for progressively intensifying said brake engaging action in one direction of rotational movement of said third driven element and for progressively reducing the engaging effort in the opposite rotational direction of movement of said third driven element, and hydraulic means for simultaneously engaging said clutch means and disengaging said brake means.

2. An automotive automatic transmission as claimed in claim 1, wherein said hydraulic means comprises a source of fluid pressure, a hydraulic actuating means for said brake means and said clutch means, said hydraulic actuating means comprising a brake actuating chamber and a brake releasing chamber, a shift valve, a throttle valve means operatively connected to said shift valve for controlling said shift valve in response to an engine throttle position, a governor means operatively connected to said shift valve for controlling said shift valve in response to an output condition of the transmission, a first hydraulic circuit provided between said source of fluid pressure and said brake actuating chamber, a second hydraulic circuit provided between said source of fluid pressure and said shift valve, a third hydraulic circuit connecting said shift valve with said brake releasing chamber and said clutch means, said shift valve being adapted for blocking fluid pressure between said second hydraulic circuit and said third hydraulic circuit in response to control signals generated by said governor means and said throttle valve means.

3. A transmission as claimed in claim 1, wherein said cam means comprises an inclined surface formed on said third driven member and a roller means mounted on said stationary member and adapted for cooperation with said inclined surface.

4. A transmission as claimed in claim 1, wherein said cam means comprises an inclined surface formed on said stationary member and a roller means mounted on said third driven member and adapted for cooperation with said inclined surface.

5. A transmission as claimed in claim 1, wherein said cam means comprises an eccentric cam rotatably mounted on said third driven member and a plane surface provided on said stationary housing member, said eccentric cam being adapted for cooperation with said plane surface for initiating application of said brake means in response to application of hydraulic pressure to said actuator unit.

6. A transmission as claimed in claim 1, wherein said cam means comprises an eccentric cam rotatably mounted on said stationary housing member, and a plane surface provided on said third driven member, said eccentric cam being adapted for cooperation with said plane surface for initiating application of said brake means when hydraulic fluid pressure is applied to said hydraulic actuator unit.

References Cited

UNITED STATES PATENTS

| | | | |
|---|---|---|---|
| 2,204,872 | 6/1940 | Thompson | 74—868 |
| 3,022,676 | 2/1962 | Duffy | 74—868 |
| 2,507,050 | 5/1950 | Roberts | 74—781 |
| 2,578,308 | 12/1951 | Iavelli | 74—781 |
| 2,649,175 | 8/1953 | Stripling | 192—93 X |
| 2,675,105 | 4/1954 | Kelley | 192—93 |
| 2,955,681 | 10/1960 | Burnett | 188—72 |
| 3,260,331 | 7/1966 | Borman | 188—72 |

ARTHUR T. McKEON, Primary Examiner

U.S. Cl. X.R.

74—868